(12) United States Patent
Gunther et al.

(10) Patent No.: US 8,633,390 B2
(45) Date of Patent: Jan. 21, 2014

(54) HOOKUP STEM AND ELECTRIC HOOKUP

(75) Inventors: Herbert Gunther, Allendorf (DE);
Siegrid Sommer, Burgwald (DE);
Christel Kretzschmar, Dohna (DE);
Uwe Partsch, Dresden (DE)

(73) Assignee: Gunther Heisskanaltechnik GmbH, Frankenberg (DE)

( * ) Notice: Subject to any disclaimer, the term of this patent is extended or adjusted under 35 U.S.C. 154(b) by 221 days.

(21) Appl. No.: 12/933,513

(22) PCT Filed: Mar. 18, 2009

(86) PCT No.: PCT/EP2009/001992
§ 371 (c)(1),
(2), (4) Date: Sep. 20, 2010

(87) PCT Pub. No.: WO2009/115306
PCT Pub. Date: Sep. 24, 2009

(65) Prior Publication Data
US 2011/0005831 A1   Jan. 13, 2011

(30) Foreign Application Priority Data
Mar. 20, 2008 (DE) .......... 10 2008 015 378

(51) Int. Cl.
*H01R 4/00* (2006.01)
*H02G 3/06* (2006.01)
*H01R 13/46* (2006.01)

(52) U.S. Cl.
USPC ........ 174/84 R; 174/94 R; 174/260; 439/626; 439/875

(58) Field of Classification Search
None
See application file for complete search history.

(56) References Cited

U.S. PATENT DOCUMENTS

| | | | | |
|---|---|---|---|---|
| 4,978,814 A | * | 12/1990 | Honour | 174/94 R |
| 7,247,381 B1 | * | 7/2007 | Watanabe et al. | 428/413 |
| 7,723,620 B2 | * | 5/2010 | Kawade et al. | 174/267 |
| 7,964,825 B2 | * | 6/2011 | Russegger et al. | 219/534 |
| 2003/0162415 A1 | | 8/2003 | Spaulding et al. | |
| 2005/0280032 A1 | | 12/2005 | Hutter, III | |

FOREIGN PATENT DOCUMENTS

| | | |
|---|---|---|
| FR | 2 635 616 A1 | 2/1990 |
| WO | 2004/043672 A1 | 5/2004 |
| WO | 2005/053361 A3 | 6/2005 |

* cited by examiner

*Primary Examiner* — Chau Nguyen
*Assistant Examiner* — Dion Ferguson
(74) *Attorney, Agent, or Firm* — Clark & Brody

(57) ABSTRACT

A hookup stem (48; 70) to implement an electric hookup (50; 60) of an electric heater of an injection molding nozzle (30), the hookup stem (48; 70) being designed in a manner that it can be affixed by means of at least one electrically conducting adhesion layer (52; 62; 64; 66) and/or by a contact paste (52) to the heater, the hookup stem comprising a shank element (54; 72), and a connecting segment (56; 74) coming into contact with the minimum of one adhesion layer (52; 62; 64; 66) or the contact paste (52).

9 Claims, 5 Drawing Sheets

HOOKUP STEM AND ELECTRIC HOOKUP

The present invention relates to a hookup stem as defined in the preamble of claim 1 and to an electric hookup defined in claim 6.

Many different designs of an injection molding nozzle's heater implementing the electric hookup of said heater are known in the state of the art. One way to implement such an electric hookup for instance is to affix a hookup lead linked to a control system's electric power source by means of a contact paste to a heating conductor track of an electric heater. The contact paste is electrically conducting and in this manner implements the heater's electric hookup.

FIG. 1 diagrammatically shows a known electric connection 10. The reference 12 denotes an electrically conducting substrate, for instance in the form of a hot runner nozzle's feed pipe. The reference 14 denotes a dielectric layer acting as an electric insulator deposited on the substrate 12. A heating conductor track 16 is deposited on the dielectric layer and consists of a first conducting material and is part of an electric heater not shown in detail here. The reference 18 denotes a hookup lead linked directly or by means of an additional electric conductor to an omitted electric power source. Said power source feeds the heater's heating conductor track 16. The hookup lead 18 is an electric conductor, or a stranded wire made of a second electrically conducting material which differs from that of the heating conductor track 16. In order it subtend said hookup surface 17, the hookup lead 18 is bent at its free end or else it is fitted with a flattened foot in order to subtend a substantially L-shaped geometry in this region. To implement the electric hookup 10, the hookup surface 17 of the hookup lead 18 is affixed by means an electrically conducting contact paste 20 onto the heating conductor track 16, as a result of which the hookup lead 18 and the heating conductor track 16 are electrically joined to each other.

The resistance to shear forces—i.e the positional stability—of the electric connection 10 of FIG. 1 substantially depends on the adhesion between the hookup lead 18 and the contact paste on one hand and on the other between the contact paste 20 and the heating conductor track 16. However, because the first electrically conducting material of the heating conductor track 16 differs from the second electrically conducting material of the hookup lead 18, the material of the conductor paste 20 must be elected in a way to assure good adhesion both with respect to said first electrically conducting material of the hookup lead 16 and with respect to the second electrically conducting material of the hookup lead 18. However these two goals cannot be attained simultaneously, and as a result the selection of the contact paste most of the time is only a compromise. Consequently the above design does not allow optimal positional stability. Also, depending on the kind of contact paste, adhesion-related problems may arise at higher temperatures, entailing a drawback especially when using hot runner nozzles, the more so when such contacts come loose in part or in whole.

Based on this state of the art, one of the objects of the present invention is to create an alternative electric hookup for an injection molding nozzle's electric heater, where said hookup eliminates at least in part the above cited problems.

The goal of the present invention is to circumvent the above and further drawbacks of the state of the art and to create an injection molding nozzle electric heater offering optimal adhesive properties. In particular said shear resistance [positional stability] shall be substantively improved in a manner that even in the presence of significant mechanical loads and/or at higher temperatures, permanent and well-conducting connection shall be assured.

The main features of the invention are disclosed in claims 1 and 6. Claims 2 through 5 and 7 through 14 define embodiment modes.

To solve said problem, the present invention provides a hookup stem to implement an electric hookup of an injection molding nozzle's electric heater, said hookup stem being designed in a manner that in the presence of at least one electrically conducting bonding layer and/or a contact paste it can be affixed to the said heater. In the present invention, the hookup stem comprises a cylindrical segment and a connecting segment making contact with the minimum of one adhesion layer or with the contact paste, said connecting segment assuring that tensile loads applied to the hookup stem of the invention shall be uniform in all directions to preserve the hookup stem from spalling respectively being sheared off when exposed to appreciable tensile loads. Contrary to the case of the initially cited case, the shear strength and therefore the overall strength of the electric hookup thus can be improved in the present invention.

Preferably the heater is a thick-film heater deposited like a track along the injection molding nozzle zones to be heated. In particular such a thick film heater is easily manufactured and compact, thus reducing the injection molding nozzle bulk.

The connecting segment preferably shall be a discoid and its diameter shall be larger than that of the shank element. Such a geometry was found especially advantageous to render the tensile loads applied to the shank element of the hookup stem even more uniform in all directions.

The connecting segment side facing the adhesion layer or the contact paste advantageously is fitted with a contour matching that of the particular electrically conducting component to which the connecting segment is affixed by means of at least one electrically conducting adhesion layer and/or by the contact paste. Illustratively if the connecting segment is mounted on the heating conductor track of a thick film heater, the contour of the connecting segment side facing the adhesion layer is selected in a way that it substantially matches the curvature of the heating conductor track respectively the feed pipe.

Advantageously a transition element is provided between the shank element and the connecting segment and is designed in a manner that the respective diameters of said shank element and of the connecting segment merge into each other continuously or step-wise. As a result the transition between the shank element and the connecting segment shall be smooth, attaining thereby very substantially the mechanical strength of the hookup stem. Using such a geometry, the hookup stem can withstand even larger external loads.

The present invention moreover relates to an electric hookup of an injection molding nozzle's heater, where said hookup includes a hookup stem of the above cited kind.

In this respect the present invention configures at least two electrically conducting adhesion layers between the hookup stem's connecting segment and the electric heater, said adhesion layers exhibiting different properties, different compositions and/or different adhesion layer materials.

Such a design makes it possible to optimally connect to each other the first and the second components even though they are made of different materials because the adhesion layers between the components may be matched with respect to their properties, compositions and/or adhesion layer materials in steps, respectively layers, to the particular differing materials of the components to be connected. The transition from the first electrically is conducting component made of the first material to the second electrically conducting component made of the second material therefore takes place comparatively smoothly, for instance the first adhesion layer being matched to the first material of the first component and the second adhesion layer being matched both to the material of the first adhesion layer and to the second material of the second component. In this manner optimal adhesion strength is attained between the individual layers, and as a result optimal (anti)shear strength between the components.

In this respect the present invention further provides that each adhesion layer be matched to a directly adjacent adhesion layer and/or to a directly adjacent electrically conducting component, preferably each adhesion layer being selected and designed in a manner to match their properties, composition and/or adhesion material to the properties, composition and/or adhesion material of a directly adjacent adhesion layer and/or to the properties, composition and/or the material of a directly adjacent electrically conducting component.

Accordingly the invention provides more than a single contact layer with which to directly join electrically two components made of different materials. Instead the connection is implemented in several stages comprising a sequence of layers, each layer implementing an optimized temperature-resistant connection, in a manner that the components are firmly and durably connected to each other and easily withstand even high mechanical loads or the thermal cycles arising in injection molding also at high temperatures.

A substantial factor contributing to this improvement of the invention is attained when selecting the properties, the composition and/or the material of each adhesion layer in a manner that the adhesion of such layers shall be matched to that of a particular adjacent adhesion layer and/or to that of a directly adjacent electrically conducting component. Appropriately each adhesion layer exhibits a different adhesiveness.

As a result, all the layers are mutually matched in adhesiveness, thereby producing an extremely solid and durable dimensionally stable connection and evincing increased shear strength compared to the conventional electric hookups discussed above.

Another property allowing mutually matching the particular adhesion layers and components relates to thermal expansion. The components made of different materials and to be electrically connected frequently have widely different coefficients of thermal expansion, so that, when exposed to high temperatures, stresses may arise within the connection. Cracks to may form at the components which may even detach from each other. Using the individual adhesion layers, the thermal expansions of the components to be connected may be approximated in steps in a manner that for instance regarding heater operation, stresses or tensions do not arise within the connection.

Regarding their properties, compositions, adhesion layer material, adhesiveness and/or their thermal expansion features, the adhesion layers therefore subtend a gradient design which both provides optimal electric hookup and additionally very high mechanical and thermal strength.

In a further embodiment mode of the present invention, the adhesive material of each adhesion layer is in the form of a solder, a contact paste or a thick film paste, the adhesive material of each layer illustratively including silver, palladium and/or at least one vitreous phase proportion. These materials may be easily combined and therefore allow attaining the layers' desired properties respectively compositions. Also they are easily processed, for instance the solder, the contact paste or the thick film paste may be deposited as layers by screen printing. The layer structure as a whole is compact, resulting in a relatively low overall connection—this feature being advantageous in particular as regards hot runner nozzles.

Further features, particulars and advantages of the present invention are stated in the claims and in the description below of illustrative embodiment modes and are shown in the appended drawings.

FIG. 1 shows a schematic cross-section of a known hookup,

FIG. 2 shows a schematic cross-sectional elevation of an injection molding nozzle, FIG. 3 is a schematic cross-sectional elevation of an electric hookup of a first embodiment mode of the present invention applicable to the injection molding nozzle of FIG. 2, FIG. 4 is a schematic cross-sectional elevation of an electric hookup of a second embodiment mode of the present invention, applicable to the injection molding nozzle of FIG. 2, FIG. 5 is a schematic cross-sectional elevation of an alternative embodiment mode of a hookup stem applicable to the geometries shown in FIGS. 3 and 4, FIGS. 6A, 6B are schematic cross-sectional elevations indicating a manufacturing procedure for the hookup stems shown in FIGS. 3 and 4, and FIGS. 7A, 7B show schematic cross-sectional elevations elucidating a manufacturing procedure for the hookup stem shown in FIG. 5.

Identical reference symbols below refer to identical or similar components

The injection molding nozzle 30 shown in FIG. 2 is part of injection molding equipment processing thermoplasts and for that purpose is fitted with an omitted housing for affixation to an omitted manifold, said housing receiving a substantially cylindrical plastic feed pipe 32.

A base 34 at the end of said pipe 34 terminates flush with the housing and rests in sealing manner against the manifold. A nozzle tip 36 is terminally inserted, preferably threaded into the axially running feed pipe 32 and extends the flow duct 38 as far as the omitted plane of a mold cavity, also omitted. The nozzle tip 36 also may be integral with the feed pipe 32 while the operation remains unchanged.

A ceramic dielectric layer 42 is deposited on the wall 40 of the steel feed pipe 32 and heating conductor tracks 44 are configured in turn on the said dielectric layer to run straight, or in zig-zag manner or in other ways along the outer surface of said dielectric. An outer sheath 46 covers the heating conductor tracks 44 and electrically insulates and externally covers the dielectric layer 42. The arbitrarily shaped heating conductor tracks 44 may be deposited in differently tight arrays and configurations on the dielectric layer 42 depending on the required electric power. Consequently a particular needed temperature distribution may be set inside the feed pipe 32.

To apply electric power to the heating conductor track 44, this track is connected by electric terminals to hookup lines 48 which in turn may be electrically connected to a source of electric power.

FIG. 3 is a schematic cross-sectional elevation of a first embodiment mode of an electric hookup 50 of the present invention.

Figure 3:
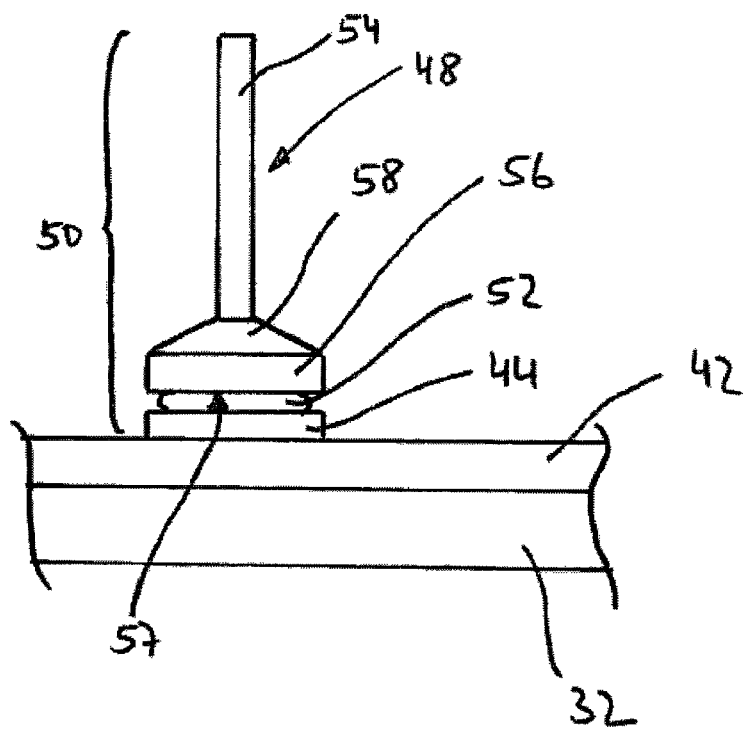
FIGS. 3 and 4 show two embodiment modes of such electric hookups 50, 60 designed in the manner of the present invention.

FIG. 3 shows the feed pipe 32, further the dielectric layer 42 constituted on said pipe, and the heating conductor track 44 mounted on the dielectric layer 42, the track 44 being made of a first, electrically conducting material such as Ag, Pd and, depending on the embodiment mode, comprising at least one glass phase. The heating conductor track 44 is electrically connected to a hookup stem 48 made of a second electrically conducting material—of silver in the present instance. A contact paste 52, in this instance made of silver, is configured between the heating conductor track 44 and the hookup stem 48.

The heating conductor track 44, the contact paste 52 and the hookup stem 48 together constitute the electric hookup 50 of the heater of the injection molding nozzle 30. The hookup stem 48 comprises a shank element 54 and a connecting segment 56 of which the contact face 57 makes contact by means of the contact paste 52 with the heating conductor track 44. The connecting segment 56 is discoid and exhibits a diameter larger than that of the shank element 54 in order to enlarge the contact area 57 and to omni-directionally spread tensile forces acting on the shank element 54. In the present design, a frusto-conical transition element 58 is present between the shank element 54 and the connecting segment 56 and assures that the diameters of the shank element 54 and of the connecting segment 56 merge continuously into each other. The transition element 58 increases the mechanical strength of the shank element 48 and hence its service life. It is understood that the transition element 58 also may assume another geometry, for instance the diameters of the shank element 54 and of the connecting segment 56 merging step-wise into each other.

Figure 1:
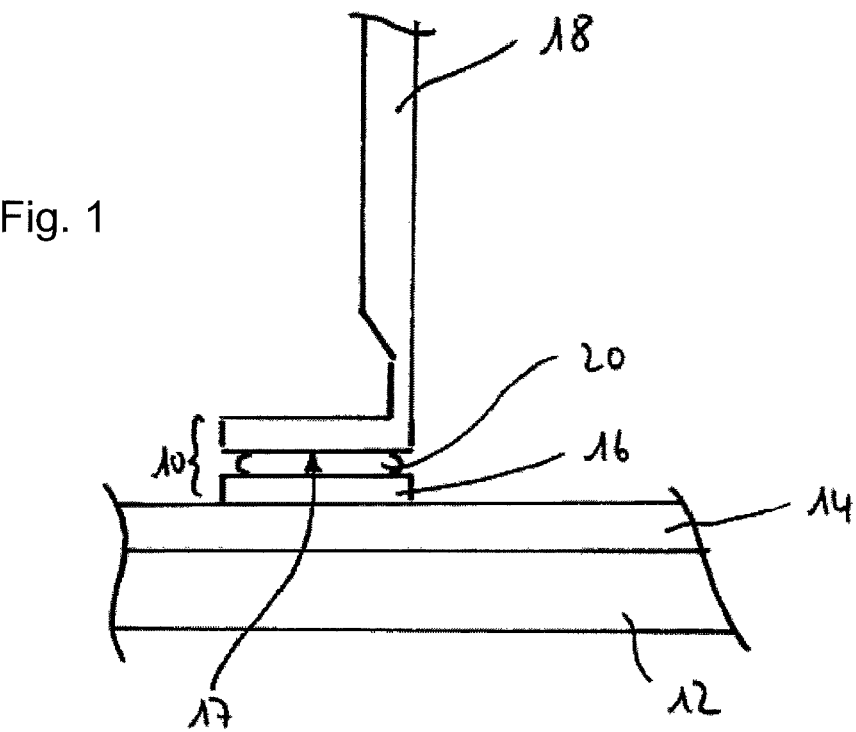

The hookup stem 48 of the above design offers the advantage—relative to the L is shaped electric hookup lead 18 of FIG. 1—to better and more uniformly distribute in all directions the tensile loads applied to the electric hookup 50.

Figure 4:
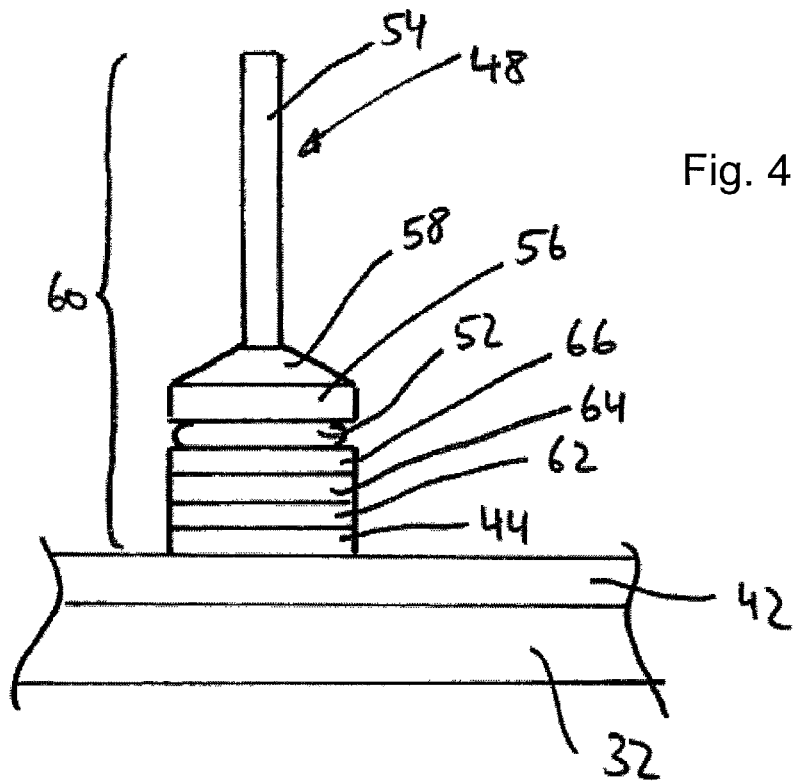

FIG. 4 is a schematic cross-sectional elevation of an alternative embodiment mode of an electric hookup 60 of the present invention. The electric hookup 60 differs from the electric hookup 50 of FIG. 3 by the provision between the heating conductor track 62 and the contact paste 52 of a series of a first electrically conducting adhesion layer 62 made in this instance of AgPd in a ratio of 3:1, of a second electrically conducting adhesion layer 64 which in this instance is made of AgPd in a ratio of 9:1, and of a third electric adhesion layer 66 which in this instance is made of AgPd in a ratio of 27 to 1. These individual layers may also contain various vitreous phase proportions as needed.

Said electrically conducting adhesion layers 52, 54, and 56 are solders or thick film pastes illustratively deposited by screen printing. The heating conductor track 44, the first electrically conducting adhesion layer 62, the second electrically conducting adhesion layer 64, the third electrically conducting layer 66, the contact paste 52 and the contact stem 48 together constitute the electric hookup 60.

By appropriately selecting the materials of the electrically conducting adhesion layers—of which the silver content decreases in the direction of the heating conductor track 44, one obtains a step-wise transition from the material of the hookup stem 48 to the material of the heating conductor track 44 and thereby the adhesion between the individual components of the electric hookup 60 and thus the shearing resistance—i.e. the positional stability—of the entire electric hookup 60 shall be improved relative to the case for the electric hookup 50 shown in FIG. 3. In addition, the temperature stability of the electric hookup 60 is affected positively, offering a great advantage in the present field of application.

It is understood that the number of electrically conducting adhesion layers is not restricted to being three layers. Alternatively two adhesion layers also may be used, or more than three. The optimal number of adhesion layers illustratively may be determined empirically depending on the application. Also the contact paste 52 is optional and therefore may be omitted.

Figure 5:
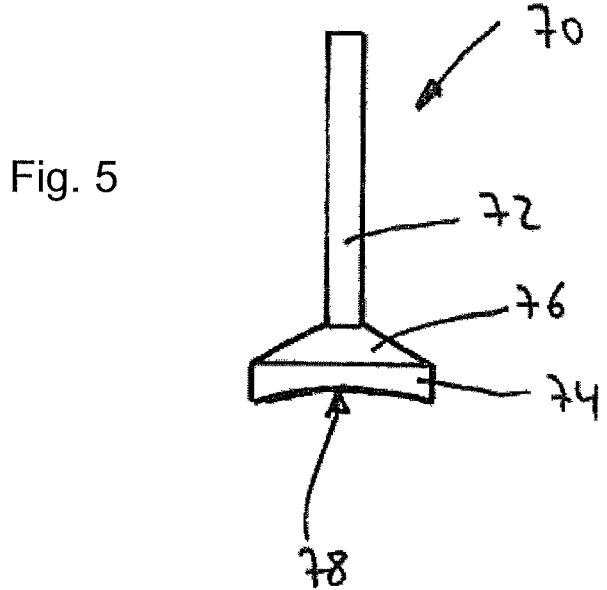

FIG. 5 is a schematic elevation of an alternative hookup stem 70 applicable to the electric hookups 50 and 60 of FIGS. 3 and 4. Similarly to the hookup stem 48, the hookup stem 70 comprises a shank element 72, further a substantially dish-shaped/discoid connecting segment 74 and a transition element 76 that connects said shank element 72 to the connecting segment 74. Contrary to the design of the hookup stem 48, however, a contact face 78 that—when the electric hookup is implemented by means of the contact paste 52—will make electric contact with an electrically conducting adhesion layer of the heater's heating conductor track and is designed in a way that its contour matches that of the heating conductor track 44. Because the feed pipe 32 and the dielectric layer 42 shown in FIG. 2 and mounted on said pipe are cylindrical, the heating conductor track 44 also exhibits a corresponding curvature to which is matched in turn in this design by the contact face 78 of the connecting segment 74 of the hookup stem 70. This design offers further improvement in connection.

Figure 2:
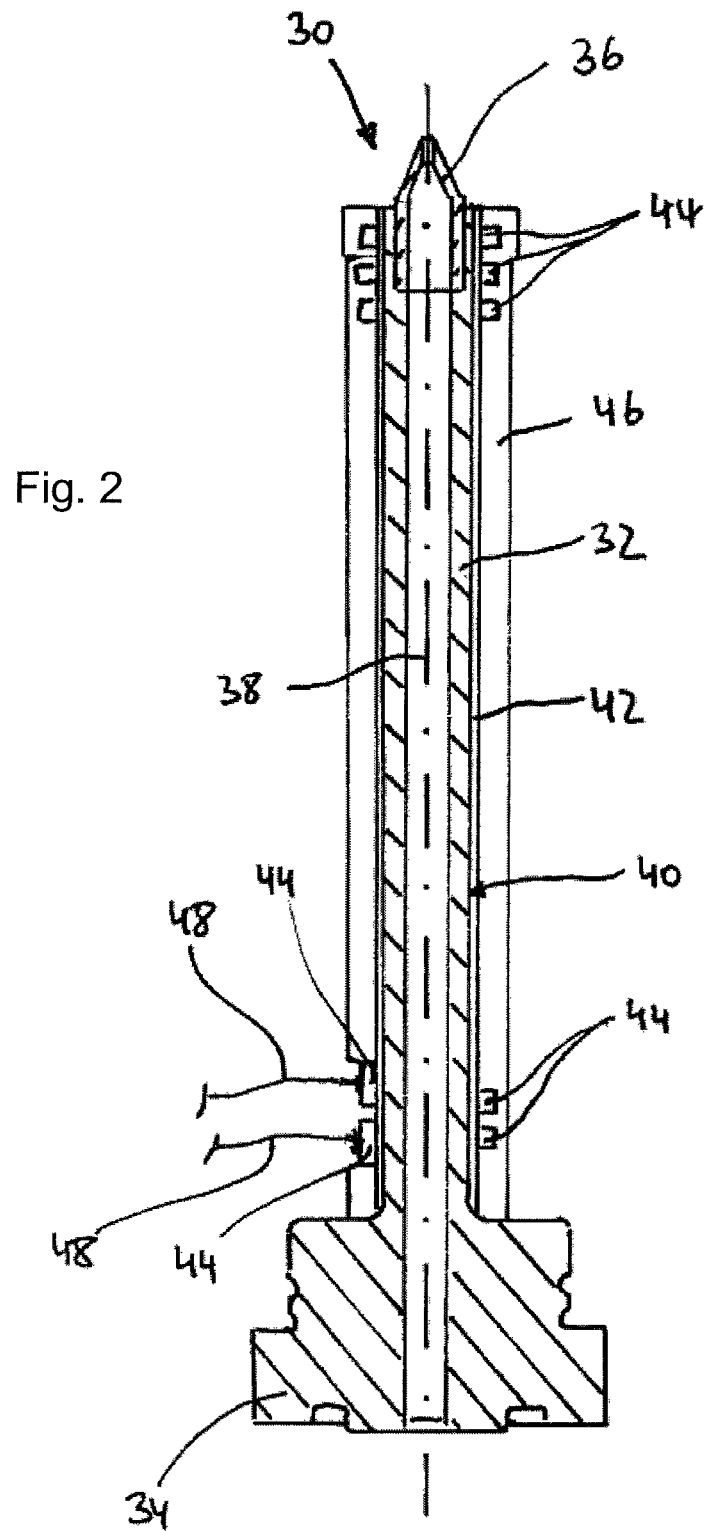
Figure 6A:
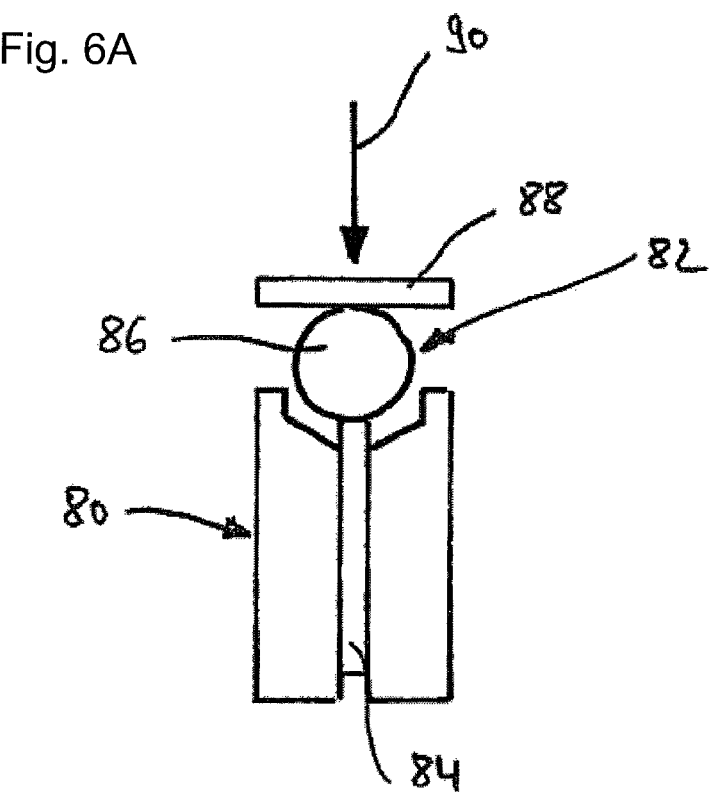
Figure 6B:
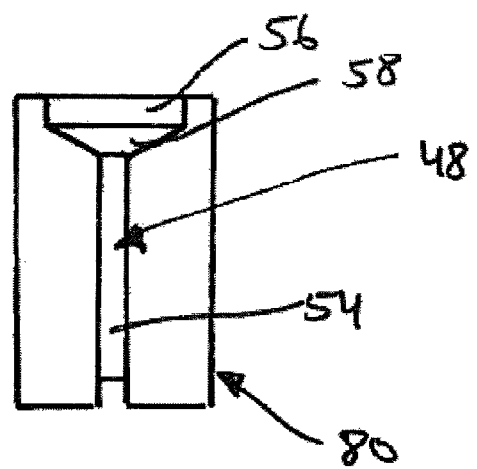

FIGS. 6A and 6B are schematic elevations and illustrate two sequential procedural steps of a manufacturing process for the hookup stem 48 of FIGS. 2 and 4. As indicated in FIG. 6A, a blank 82 is inserted into a compression mold 80 fitted with a contour which hugs the hookup stem 48, said blank comprising a stem region 84 and a spherical segment 86 linked to each other. Illustratively the blank 82 may be manufactured by soldering/welding the spherical segment 86 to the stem region 84. Other manufacturing methods of course may be used. The blank 82 inserted into the compression mold 80 then is loaded by the compression plate 88 in the direction of the arrow 90 at a given pressure, as a result of which the spherical segment 86 is forced into the compression mold 80. This procedure is used to manufacture, as shown in FIG. 6B, the hookup stem 48 with the shank element 54, the connecting segment 56 and the transition element 58.

Figure 7A:
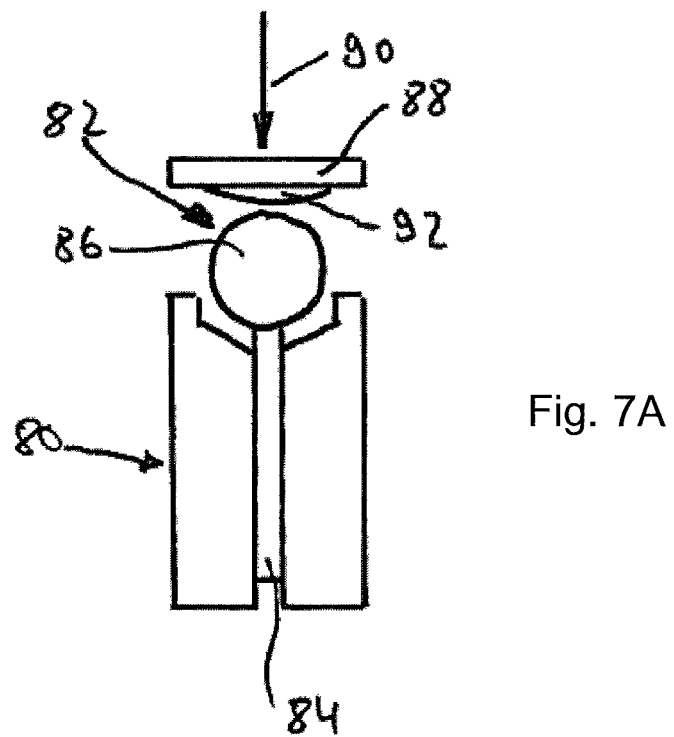
Figure 7B:
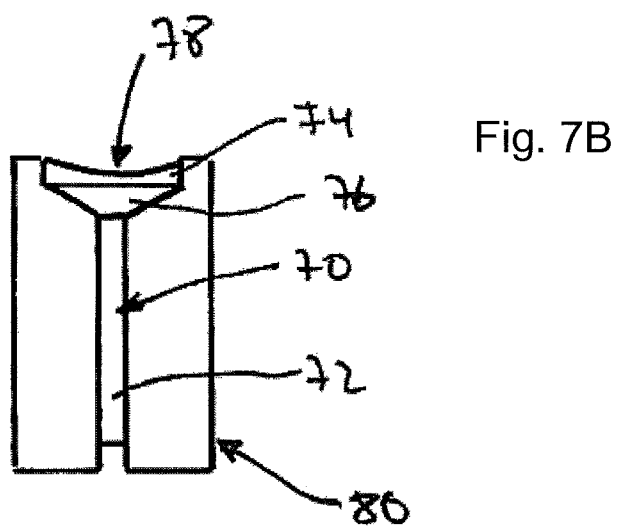

FIGS. 7A and 7B are schematic elevations and show two sequential procedural steps when making the contact stem 70. The manufacturing procedure shown in FIGS. 7A, 7B only differs from that shown in FIGS. 6A, 6B in that the underside of the compression plate 88 is fitted with a bulge 92 subtending the convex contact face 78 of the hookup stem 70 as shown by FIG. 7B.

The present invention is not restricted to one of the above discussed embodiment modes, on the contrary it may be modified in many ways. Illustratively the contour of the contact face 78 of the hookup stem 70 being selected in relation to the contour of the feed pipe 32 as hereabove also may be selected in other ways. The hookup stem also may be connected at its end with an electric lead/cable connected to the temperature control.

It should be borne in mind that the present invention relates to a hookup stem implementing the electric hookup of an injection molding nozzle's heater, said hookup stem being designed in a manner to be affixable by means of at least one electrically conducting adhesion layer and/or a contact paste to said heater, the hookup stem comprising a shank region and a connecting segment to contact the minimum of one adhesion layer or the contact paste.

All features and advantages, inclusive design details, spatial configurations and procedural steps, explicit by or implicit in the claims, specification and drawing, may be construed per se or in arbitrary combinations being inventive.

List Of References

| 10 | electric connection |
| 12 | substrate |
| 14 | dielectric layer |
| 16 | heating conductor track |
| 17 | contact face |
| 18 | hookup lead |
| 20 | contact paste |
| 30 | injection molding nozzle |
| 32 | feed pipe |
| 34 | base |
| 36 | nozzle tip |
| 38 | flow duct |
| 40 | wall |
| 42 | dielectric layer |
| 44 | heating conductor track |
| 48 | hookup stem |
| 50 | electric hookup |
| 52 | contact paste |
| 54 | shank element |
| 56 | connecting segment |
| 57 | contact face |
| 48 | transition element |
| 60 | electric hookup |
| 62 | first adhesion layer |
| 64 | second adhesion layer |
| 66 | third adhesion layer |
| 70 | hookup stem |
| 72 | shank element |
| 74 | connecting segment |
| 76 | transition element |
| 78 | contact face |
| 80 | compression mold |
| 82 | blank |
| 84 | stem region |
| 86 | spherical segment |
| 90 | arrow |
| 92 | bulge |

The invention claimed is:

1. An injection nozzle (30) heated by an electric heater and comprising an electric hookup (50; 60) being fitted with a hookup stem (48; 70), where
   (a) the heater is a thick film heater comprising a dielectric layer (42), and a heating conductor track (44) deposited on the outer surface of the dielectric layer (42),
   (b) the hookup stem (48; 70) comprises a shank element (54; 72) and a connecting segment (56; 74) making contact with the minimum of one adhesion layer (62; 64; 66) and/or a contact paste (52),
   (c) the connecting segment (56; 74) is discoid and exhibits a larger diameter than does the shank element (54; 72),
   (d) at least one transition element (58; 76) is provided between the shank element (54; 72) and the connecting segment (56; 74) and is designed in a manner that the diameter of the shank element (54; 72) and that of the connecting segment (56; 74) merge into each other stepwise or continuously,
   (e) the hookup stem (48; 70) is designed in a manner it may be affixed by means of at least one electrically conducting adhesion layer (62; 64; 66) and the contact paste (52) to said heater, and
   (f) at least two electrically conducting adhesion layers (62, 64, 66) are configured between the connecting segment (56; 74)of the hookup stem (48; 70) and the heater in a manner to connect them, the adhesion layers (62, 64, 66) and the contact paste (52) exhibiting different properties, different compositions and/or different adhesion layer materials,
   (g) wherein, each adhesion layer (52, 62, 64, 66) is matched to the particular directly adjacent adhesion layer (52, 62, 64, 66) and/or to a directly adjacent, electrically conducting component (44, 48; 62; 70) to produce a stable connection therebetween.

2. The injection nozzle as claimed in claim 1, characterized in that each adhesion layer (52, 62, 64, 66) is selected or designed in a manner that their properties, composition and/or adhesion layer material be matched to the properties, composition and/or adhesion material and/or the adhesion layer material of the particular directly adjacent adhesion layer (52, 62, 64, 66) and/or to the properties, composition and or the material of a particular adjacent electrically conducting component (44, 48; 62; 70) to produce a stable connection therebetween.

3. The injection nozzle as claimed in claim 1, characterized in that the properties, the composition and/or the adhesion layer material of each adhesion layer (52, 62, 64, 66) be selected in a manner that its adhesiveness is matched to the adhesiveness of the particular adjacent adhesion layer (52, 62, 64, 66) and/or to the adhesiveness of an adjacent electrically conducting component (44, 48; 62; 70) to produce a stable connection therebetween.

4. The injection nozzle as claimed in claim 1, characterized in that each adhesion layer (52, 62, 64, 66) exhibits a different adhesiveness.

5. The injection nozzle as claimed claims 1, characterized in that, with respect to their properties, their compositions, their adhesion layer materials, their adhesivenesses and/or their thermal expansion properties, the adhesion layers (52, 62, 64, 66) constitute a gradient structure.

6. The injection nozzle as claimed in claim 1, characterized in that the adhesion layer material of each adhesion layer (52, 62, 64, 66) is a solder, a contact paste or a thick film paste.

7. The injection nozzle as claimed claim 1, characterized in that the adhesion layer material of each adhesion layer (52, 62, 64, 66) includes silver, palladium and/or at least a proportion of a vitreous phase.

8. The injection nozzle as claimed in claim 1, characterized in that the side of the connecting segment (56; 74) facing the adhesion layer (62; 64; 66) or the contact phase (52) is fitted with a contour matched to the contour of the other electrically conducting component (44).

9. The injection nozzle as claimed in claim 6, characterized in that the adhesion layer material of each adhesion layer (52, 62, 64, 66) is a thick film paste.

* * * * *